United States Patent [19]

Arrigoni

[11] 4,333,239

[45] Jun. 8, 1982

[54] METHOD AND APPARATUS FOR INSPECTING SHROUDS OF ROTOR BLADES

[75] Inventor: John P. Arrigoni, Wallingford, Conn.

[73] Assignee: United Technologies Corporation, Hartford, Conn.

[21] Appl. No.: 155,253

[22] Filed: Jun. 2, 1980

[51] Int. Cl.³ ........................... G01B 5/02; G01B 5/25
[52] U.S. Cl. ................................. 33/174 C; 33/174 L
[58] Field of Search .............. 33/174 R, 174 L, 174 C

[56] References Cited

U.S. PATENT DOCUMENTS

| | | | |
|---|---|---|---|
| 2,938,273 | 5/1960 | Johnson | 33/174 L |
| 3,163,942 | 1/1965 | Rowland | 33/174 L |
| 3,670,421 | 6/1972 | Kiewicz et al. | 33/174 L |
| 3,832,784 | 9/1974 | Sameuls et al. | 33/174 C |
| 4,128,929 | 12/1978 | De Musis | 29/156.8 B |
| 4,222,172 | 9/1980 | Mason | 33/174 C |

FOREIGN PATENT DOCUMENTS 334222 8/1936 Italy .................................. 33/174 L

*Primary Examiner*—Richard R. Stearns
*Attorney, Agent, or Firm*—Gene D. Fleischhauer

[57] ABSTRACT

A fixture 39 for positioning shroud 22 of a rotor blade 14 with respect to an apparatus for inspecting the blade is disclosed. The fixture is formed of a base 42, locater means 40 attached to the base, first and second references 44, 46, a second locater 48 which engages the blade along a curved edge 50 at a hinged joint and measuring devices 64, 66 which are slidable rails having an axis e and an axis f. A method for inspecting the blades by orienting a shroud reference plane SRP with respect to the first and second reference surfaces is disclosed. In an alternate embodiment, the blade is rotatably supported about a flat surface and uses a surface on the root 18 for rotation. The fixture also includes a master block 68 to provide a self-mastering feature to the fixture.

15 Claims, 10 Drawing Figures

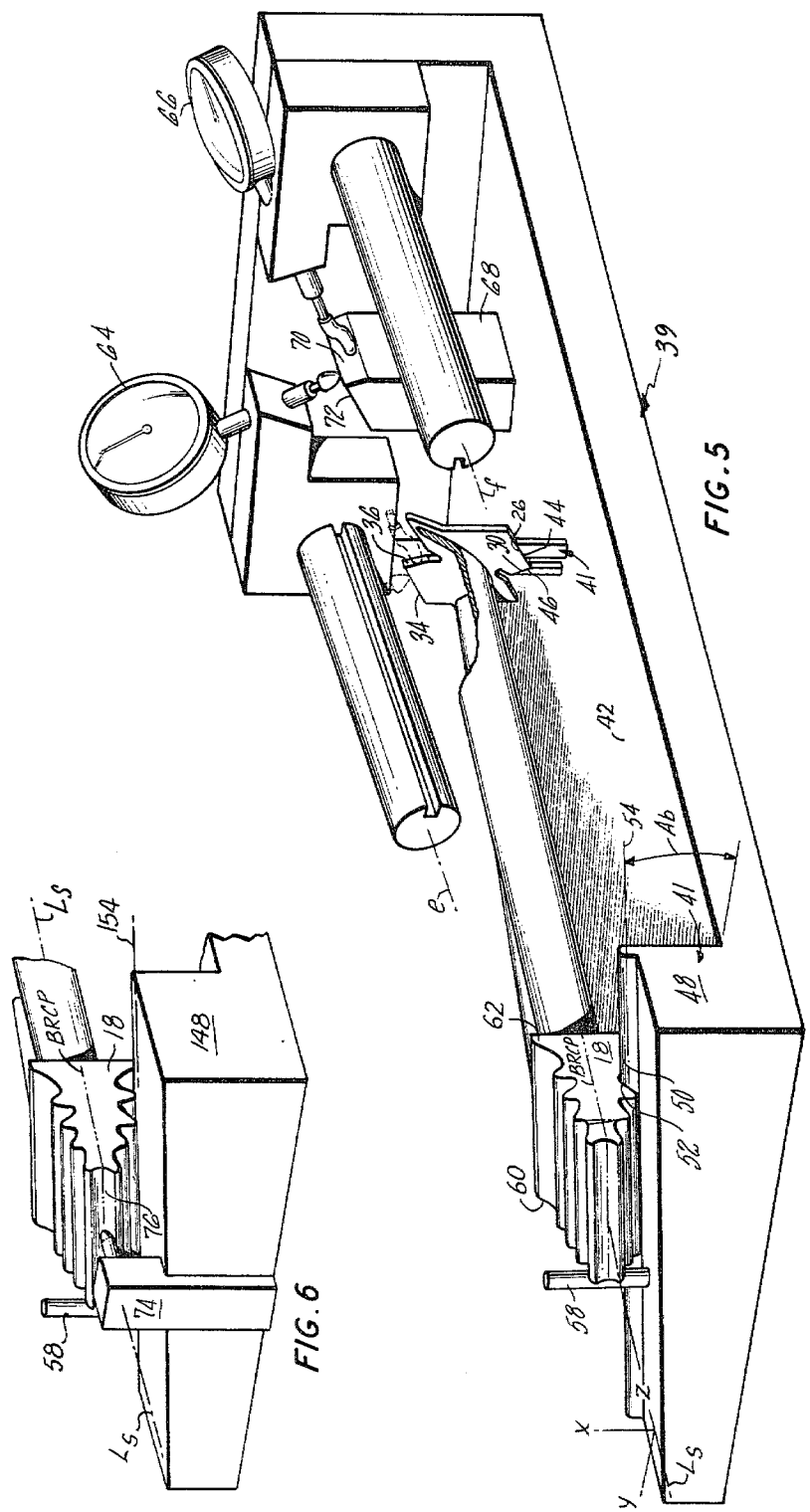

METHOD AND APPARATUS FOR INSPECTING SHROUDS OF ROTOR BLADES

TECHNICAL FIELD

This invention relates to axial flow rotary machines and more particularly to a method and fixture for inspecting the faces of a shroud extending from a rotor blade of such a machine.

BACKGROUND ART

In an axial flow rotary machine, the rotor assemblies are commonly provided with rotor blades extending outwardly therefrom. The rotor blades have a root having a groove which is adapted to engage a corresponding groove in the disk for retention of the rotor blade. An airfoil extends outwardly from the root and is used as a flow directing device for working medium gases. The airfoil has a convex side and a concave side. Each rotor blade may also be provided with a shroud, such as a tip shroud at the outer end of the airfoil. The shroud extends circumferentially to engage the shrouds of adjacent rotor blades. During operation of the rotary machine, the rotor blades and shrouds are subjected to fluctuating gas loads and to high temperatures. These fluctuating gas loads induce vibrations in the blades which are damped by rubbing between the shrouds. Such rubbing causes wear. After the rotor blade has been used for some time it becomes necessary to restore any shroud which has worn surfaces or to discard the blade. It is necessary to inspect the shroud to determine if the shroud has suffered wear or no longer has a sufficient amount of pretwist to exert the necessary preload required for operation. One method of examining the faces is to measure cross face dimensions. However, it is difficult to insure that measurements are being made with the blade in the correct orientation to determine if the blade has sufficient pretwist or if the surfaces are unworn.

DISCLOSURE OF INVENTION

According to the present invention, a fixture for inspecting the shroud of a rotor blade for sufficient pretwist, cross shroud, and cross notch dimensions orients a shroud reference plane on the blade being inspected in a known angular relationship to reference surfaces on the fixture which is identical to the angular relationship which the shroud reference plane of the blade has with respect to the corresponding shroud faces of an adjacent rotor blade made to design for a rotary machine and contained in the machine.

A primary feature of the present invention is a fixture which rotatably engages the root of a rotor blade at a hinge joint. Other features are reference surfaces on the fixture which are adapted to engage corresponding surfaces on a shroud of a rotor blade. Still other features are two measuring devices. The measuring devices are self-mastering on a master block. Yet another feature is rails which are parallel to shroud surfaces and on which the measuring devices are slidable.

A principal advantage of the present invention is the accuracy of an inspection device for pretwist cross shroud and cross notch dimensions which are self-mastering. The fixture orients the rotor blade being inspected in a precise relationship with respect to reference planes. Another advantage is the ability of the fixture to inspect the shrouds of rotor blades restored to reference planes displaced from the blade root center plane.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 5 is a perspective view of a fixture for inspecting a rotor blade.

FIG. 6 shows an alternate embodiment of a portion of the fixture of FIG. 5.

BEST MODE FOR CARRYING OUT THE INVENTION

Figure 1:
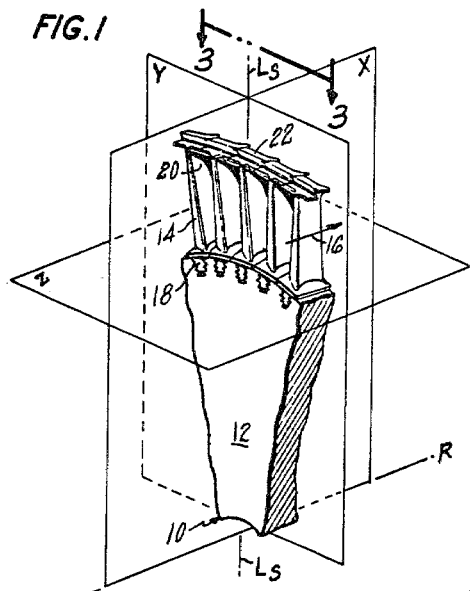
FIG. 1 is a partial perspective view of a portion of a rotor assembly for an axial flow rotary machine.

A gas turbine engine embodiment of an axial flow rotary machine is illustrated in the FIG. 1 partial perspective view. A portion of a rotor assembly 10 of the engine is shown. The rotor assembly includes a rotor disk 12 having an axis of rotation R and a plurality of rotor blades 14 extending outwardly from the disk. A flow path 16 for working medium gases extends through the rotor assembly passing between adjacent rotor blades.

Each rotor blade 14 has a root 18, an airfoil 20 and a shroud, such as a tip shroud 22. As will be appreciated, the rotor blade might also have a part span shroud which is not shown. Dimensions of the rotor blade are measured from a reference X-plane, a reference Y-plane and a reference Z-plane. In the installed condition, these reference planes have a particular orientation with respect to the axis of rotation R of the rotor assembly. The reference X-plane extends in the axial direction and contains the axis of rotation R. The reference Y-plane is a radial plane perpendicular to the axis of rotation R. The X and Y planes intersect along a reference line, commonly called the stacking line $L_s$. The reference Z-plane is perpendicular to both the X and Y planes. The Z-plane intersects the stacking line and is a tangent plane at an arbitrary radius from the axis of rotation R. The X, Y and Z planes remain with the blade in its uninstalled condition.

Figure 2:
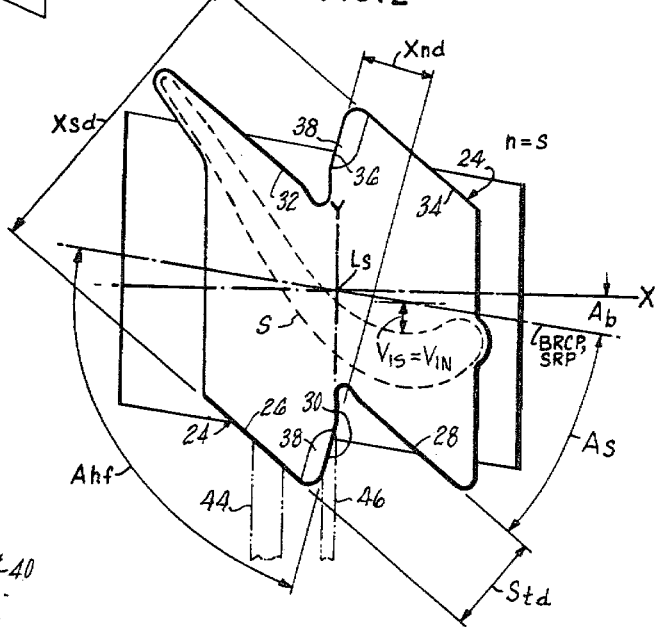
FIG. 2 is a plane view of a single shroud of a rotor blade of FIG. 1.

As shown in FIG. 2, each shroud has two tangential sides 24. Each tangential side has a tangential face 26, a second tangential face 28 and a notch face 30. The cross tangential side across the shroud has three corresponding cross faces, i.e., a first cross tangential face 32, a second cross tangential face 34 and a cross notch face 36.

The notch face 30 might be provided with a hard facing material 38 such as tungsten carbide, which is especially suited to resist wear due to rubbing contact. A blade root center plane BRCP, perpendicular to the Z-plane and passing through the stacking line $L_s$ extends through the center of the root. The blade root center plane intersects the top surface of the shroud as indicated. The blade root center plane is at an angle $A_b$ with respect to the reference X-plane. The angle $A_b$ is commonly called the broach angle. The contour of the airfoil is defined by a plurality of airfoil sections each airfoil section n being spaced a distance $V_{ln}$ from the blade root center plane as measured along a line perpendicular to the reference X-plane and parallel to the Y-plane. A particular airfoil section s is shown. The distance $X_{nd}$ is the distance between the notch faces 30 of the shroud and is commonly referred to as the cross notch dimension. The angle between a plane parallel to the hard face material and the blade root center plane is commonly called the hard face angle $A_{hf}$. The larger distance between the tangential face 26 and the second cross tangential face 34 $X_{sd}$ is commonly called the cross shroud dimension. The angle between a plane parallel to a tangential face and the blade root center plane BRCP is commonly called the shroud angle $A_s$. The distance $S_{td}$ is the distance between tangential faces on the same tangential side of the shroud and is called the step dimension. In an unused blade made as designed, a shroud reference plane SRP is coincident with the blade root center plane.

Figure 3:
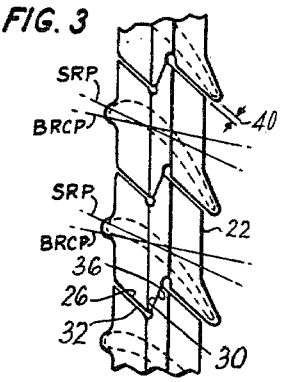
FIG. 3 is a plane view of the shrouds of the rotor assembly of FIG. 1 taken along the lines 3—3.

FIG. 3 is a developed view from above of the array of rotor blades 14 and shows the engagement between the shrouds 22 of adjacent rotor blades. The notch face of one shroud engages the corresponding cross notch face of the adjacent shroud leaving a gap 40 therebetween. The blades are typically designed to have a certain amount of pretwist. Pretwist is defined as the amount of counterclockwise shroud rotation beyond the point of line to line hardface fit. The pretwist provides positive hardface loading and causes the shroud reference plane to rotate away from the blade root center plane.

Figure 4:
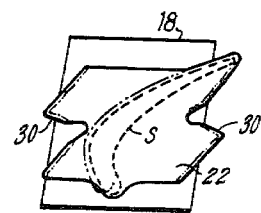
FIG. 4 is a top view of a rotor blade showing the wear on the faces and the axial and tangential dislocation of an airfoil section with respect to the root in phantom.

During operation of the gas turbine engine the rotational loads and fluctuating gas loads exerted by the working medium gases cause the rotor blades to vibrate slightly in a tangential direction pivoting about the root 18 along a line parallel to the blade root center plane BRCP. The rubbing contact between the notch faces 30 of the shrouds dampens these vibrational movements. After many hours of operation the notch faces 30 experience wear. The notch faces may wear to such an extent that the gap 40 is no longer sufficient to prevent contact between faces such as the tangential face 26 and the corresponding first cross tangential face 32 of an adjacent shroud. This contact causes these faces to wear. The wear on the notch faces and the tangential faces is shown in phantom in FIG. 4. Moreover, the airfoil dislocates tangentially and axially during operation as the working medium gases are flowed along the flow path for working medium gases 16 at high temperatures. The resultant dislocation is shown in phantom in exaggerated fashion.

The faces of the shroud 22 may be restored, for example, by depositing material on the faces and grinding the material smooth. It is therefore important to identify blades having shrouds which have lost their pretwist or which have worn beyond acceptable limits.

As will be realized, the shroud reference plane in a restored blade might pass through a line parallel to the blade root center plane and be essentially parallel to the blade root center plane if the shroud is restored to a plane which is essentially parallel to the blade root center plane. In such a case, the shroud reference plane will be coincident with the plane to which the shroud surfaces are referenced during restoration.

A fixture 39 for inspecting a rotor blade of an array of rotor blades is shown in FIG. 5. The FIG. 5 fixture is a fixture for inspecting a rotor blade for axial lean and for sufficient pretwist, cross shroud and cross notch dimensions. The fixture has locator means 41 which engages the base 42 of the fixture. The locater means has a first reference surface 44 which is adapted to engage a first tangential face 26 of a rotor blade. The locater has a second reference surface 46 which is adapted to engage a notch face 30 of a rotor blade. The reference surfaces are disposed such that the angle between the surfaces is equal to the angle between a corresponding first cross tangential face 32 and a corresponding cross notch face 36 of an adjacent rotor blade as designed for use in an array of rotor blades with the blade being inspected.

The locater means 41 at the fixture 39 has a means for orienting the shroud reference plane of the rotor blade with respect to the first reference surface 44 of the fixture and the second reference surface 46 of the fixture. In the FIG. 5 view the means for orienting the shroud reference plane is a tangential locater such as a second locater 48. The second locater has a means such as the curved edge 50 for establishing a hinge joint with a rotor blade parallel to the blade root center plane BRCP and parallel to a wall 52 bounding a groove on the root 18 of such a blade. The curved edge adapts the tangential locater to engage the wall. The hinge joint is rotatable about a reference line 54. The angle between the reference line 54 and a surface 56 may be equal to the broach angle $A_b$ or to the broach angle $A_b$ plus the amount of pretwist angle which exists between the shroud reference plane and the blade root center plane in the installed condition. In the particular fixture shown, the reference angle is equal to the broach angle $A_b$. The fixture also has an axial locater 58 which engages an edge of the root. The edge may be a leading edge 60 or a trailing edge 62. The axial locater prevents movement of the root in the axial direction.

The fixture also has a means for measuring a first distance such as a dial indicator 64. The dial indicator measures the distance between the first reference surface 44 of the fixture and the second cross tangential face 34 of a shroud mounted in the fixture. The fixture also has a means for measuring a second distance such as a second dial indicator 66. The second dial indicator measures a second distance between the second reference surface 46 of the fixture and the cross notch face 36 of a blade installed in the fixture.

Figure 7A:
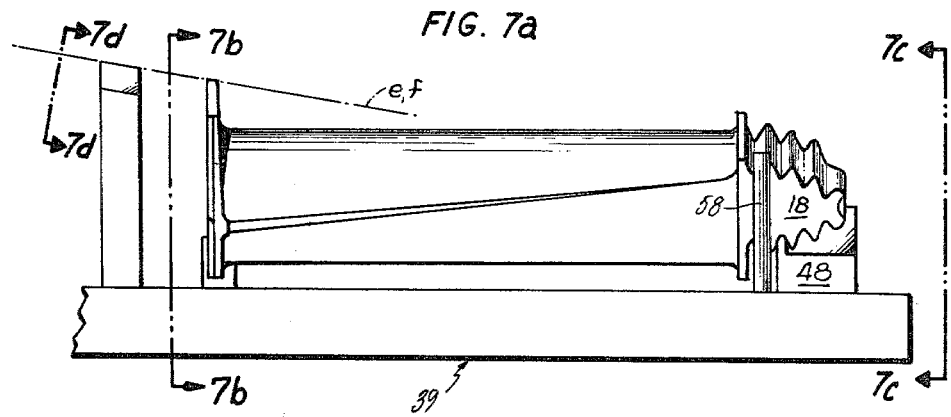
FIG. 7a is a side elevation diagrammatic view of a rotor blade in a fixture of the type shown in FIG. 5.
Figure 7B:
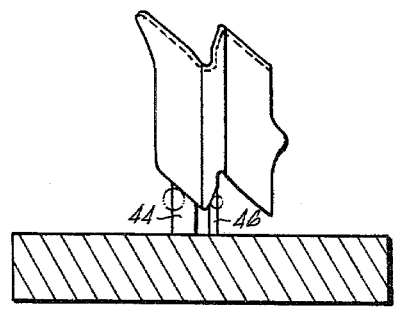
FIG. 7b is an end view taken along the lines 7b—7b.
Figure 7C:
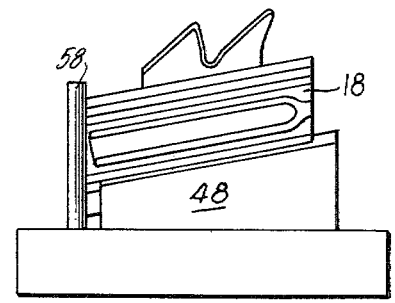
FIG. 7c is an end view taken along the lines 7c—7c.
Figure 7D:
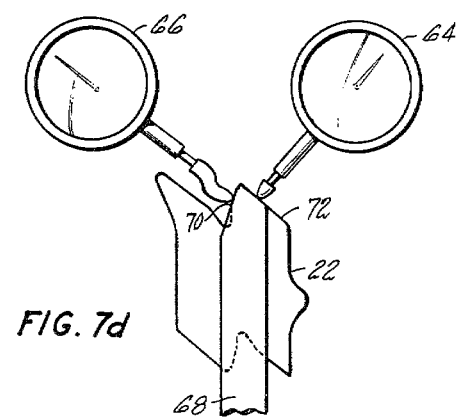
FIG. 7d is a view taken along the lines 7d—7d and is perpendicular to the axis e,f.

The fixture 39 also includes a master block 68 for calibrating one of said means for measuring. The block has a block surface 70 which is parallel to and spaced a distance from a surface being measured. An example of such a surface is a cross notch face 36. A first plane contains the corresponding reference surface 46. As shown in FIG. 7d, a second plane contains a first surface on the block, such as block surface 70, and a face of the shroud of a perfect blade, such as cross notch face 36. The cross notch face to which the block surface is parallel is a cross notch face on a blade which is made perfect, i.e. that has no variations from perfect dimensions. As will be realized from FIG. 7d the block has a similar block surface 72 which lies in a plane coincident with a second cross tangential face 34 on a master blade. The perpendicular distance between a point in a plane on the reference surface 44 and a plane containing the block surface 72 is equal to the cross shroud dimension Xsd. As shown the first dial indicator is slidable along an axis e which is parallel to the second cross tangential face of the master blade and the second dial indicator 66 is slidable along an axis f parallel to the cross notch surface of a master blade.

FIG. 6 is a view of an alternate embodiment 148 of the second locater 48. Instead of being rotatable about a curved edge, the locater has a flat surface which engages the edge of an apex of a wall bounding a groove or a serration on the root 18. A vertical orienting pin 74 abuts the base 76 of the root at the stacking line $L_s$ through which the blade root center plane BRCP passes. The FIG. 6 fixture is not a fixture for inspecting for axial lean. The FIG. 6 fixture is a fixture for inspecting a rotor blade for sufficient pretwist, cross shroud and cross notch dimensions. FIG. 7a, FIG. 7b, FIG. 7c and FIG. 7d are views of the inspection fixture 39 shown in FIG. 5. As shown in FIG. 7b the first reference surface and second reference surface locaters may be circular and are shown by the dotted lines. Each circular locater engages a corresponding face of the shroud along a tangent line. FIG. 7d is a view taken perpendicular to axes e and f and shows the surfaces on the master block 68 in line with the faces on the master blade.

The method of inspecting a rotor blade such as the rotor blade shown in FIGS. 2, FIG. 5 and FIGS. 7a–7d, of an array of rotor blades 14 comprises the steps of:

(1) orienting the shroud reference plane SRP of the rotor blade 14 with respect to a first reference surface externally of the blade, such as the reference surface 44, such that the shroud reference plane of the blade has the same angular relationship with respect to the first reference surface 44 that the shroud reference plane has with respect to a corresponding first cross tangential face 32 of an adjacent rotor blade which is made to design and which is installed in a rotary machine having a rotor assembly such as the rotor assembly 10;

(2) orienting the shroud reference plane SRP of the rotor blade with respect to a second reference surface, such as the second reference surface 46, externally of the blade such that the shroud reference plane of the blade has the same angular relationship with respect to the second reference surface externally of the blade that the shroud reference plane is designed to have with respect to a corresponding cross notch face, such as the cross notch face 36 on the adjacent blade in the rotor assembly 10 of the rotary machine;

(3) moving the first tangential face, such as the tangential face 26, towards the first reference surface 44 and the notch face 30 on the blade towards the second reference surface 46 and engaging one of the faces with one of the corresponding reference surfaces;

(4) measuring a first distance, such as the cross shroud dimension Xsd, between the first reference surface 44 and the second cross tangential face 34 of the shroud on the rotor blade;

(5) measuring a second distance, such as the cross notch distance Xnd, between the second reference surface 46 and the cross notch face 36 on the rotor blade;

(6) comparing the value of the first distance (Xsd) with a predetermined range of values and the second distance (Xnd) with a second predetermined range of values and rejecting the blade if a distance is not within the predetermined range.

The method discussed above wherein step 1, the step of orienting the rotor blade may include the step of engaging rotatably the blade root 18 at a hinge joint such that the axis of the hinge joint, either axis 54 or axis 154, is parallel to the shroud reference plane SRP. In those rotor blades, such as the rotor blade 14 having a base 18 which has a groove bounded by a wall, the step of engaging rotatably the blade root may include engaging the wall of a groove either with a curved edge as shown in FIG. 5 or with a flat edge on the apex of the wall as shown in FIG. 6.

It should be understood that the invention is not limited to the particular embodiments shown and described herein, but the various changes and modifications may be made without departing from the spirit and scope of this novel concept as defined by the following claims.

I claim:

1. A method for inspecting a rotor blade of an array of rotor blades of the type found in an axial flow rotary machine, each blade including a root, an airfoil, a shroud attached to the airfoil, each shroud having a shroud reference plane, a notch face adapted to engage a second reference surface, a cross notch face on the other side of the shroud which corresponds to the notch face, a cross notch dimension measured along a line perpendicular to the notch face and the cross notch face, a first tangential face adapted to engage a first reference surface, a second tangential face and a first cross tangential face, a second cross tangential face on the other side of the shroud which correspond respectively to the first tangential face and the second tangential face, and a cross shroud dimension measured along a line perpendicular to the first tangential face and the second cross tangential face, comprising the steps of:

orienting the shroud reference plane of the rotor blade with respect to a first reference surface externally of the blade such that the shroud reference plane of the blade has the same angular relationship with respect to said first reference surface externally of the blade that the shroud reference plane has with respect to a corresponding first cross tangential face of an adjacent rotor blade made to design in a rotary machine;

orienting the shroud reference plane of a rotor blade with respect to a second reference surface externally of the blade such that the shroud reference plane of the blade has the same angular relationship with respect to the second reference surface externally of the blade that the shroud reference plane is designed to have with respect to a corresponding cross notch face on the adjacent blade in the rotary machine;

moving the first tangential face towards the first reference surface and the notch face towards the second reference surface and engaging one of the faces with one of the corresponding reference surfaces;

measuring a first distance between the first reference surface and the second cross tangential face of the shroud;

measuring a second distance between the second reference surface and the cross notch face;

comparing the value of the first distance with a predetermined range of values and the second distance with a second predetermined range of values and rejecting the blade if a distance is not within the predetermined range.

2. The method of claim 1 wherein the step of orienting the rotor blade includes the step of engaging rotatably the blade root at a hinge joint such that the hinge joint is parallel to the shroud reference plane.

3. The method of claim 2 wherein the root has a groove bounded by a wall and the step of engaging rotatably the blade root includes engaging the wall of a groove.

4. A fixture for inspecting a rotor blade of an array of rotor blades of the type found in an axial flow rotary machine, each blade including a root, an airfoil, a shroud attached to the airfoil, each shroud having a shroud reference plane, a notch face, a cross notch face on the other side of the shroud which corresponds to the notch face, a cross notch dimension measured along a line perpendicular to the notch face and the cross notch face, first and second tangential faces, first and second cross tangential faces on the other side of the shroud which correspond to the first and second tangential faces, a cross shroud dimension measured along a line perpendicular to the first tangential face and the second cross tangential face, which comprises:

locator means on the fixture having a first reference surface which is adapted to engage the first tangential face of the rotor blade and having a second reference surface on the fixture which is adapted to engage the notch face of the rotor blade, the reference surfaces being disposed such that the angle between the surfaces is equal to the angle between a corresponding first cross tangential face and a corresponding cross notch face of an adjacent rotor blade;

means for orienting the shroud reference plane of the rotor blade with respect to the first reference surface of the fixture and the second reference surface of the fixture such that the shroud reference plane of the rotor blade has the same angular relationship with respect to the reference surfaces that the shroud reference plane has in the machine with respect to a corresponding first cross tangential face and a corresponding cross notch face of an adjacent blade made to design;

means for measuring a first distance between the first reference surface of the fixture and the second cross tangential face of the shroud;

means for measuring a second distance between the second reference surface of the fixture and the cross notch face.

5. The fixture of claim 4 wherein the airfoil of the rotor blade has a stacking line formed by the intersection of a plane extending in the axial direction and a plane extending in the tangential direction, wherein the root has a groove bounded by a wall and wherein the means for orienting the shroud reference plane of the rotor blade includes an axial locator which is adapted to engage the root of the rotor blade and to prevent movement of the root in the axial direction, and includes a tangential locator which is adapted to engage the root of the rotor blade at a hinge joint parallel to the blade root center plane and parallel to the wall bounding the groove on the root of the rotor blade.

6. The fixture of claim 4 or claim 5 wherein a first plane contains one of said reference surfaces and the fixture further includes a master block for calibrating one of said means for measuring, the block having a block surface in a second plane parallel to the first plane, wherein the second plane is spaced from the first plane a predetermined distance.

7. The fixture of claim 6 wherein the predetermined distance is equal to the cross shroud dimension of the rotor blade.

8. The fixture of claim 6 wherein the predetermined distance is equal to the cross notch dimension.

9. The fixture of claim 7 wherein the means for measuring a first distance between the first reference surface of the fixture and the second cross tangential face of the shroud is slidable along an axis parallel to the first plane.

10. The fixture of claim 8 wherein the means for measuring a second distance between the second reference surface of the fixture and the cross notch face is slidable along an axis parallel to the first plane.

11. The fixture of claim 5 wherein the wall bounding the groove of the root includes an apex having an edge and wherein the tangential locater has a flat surface which adapts the locater to engage the edge of the apex.

12. The fixture of claim 11 wherein the root has a base and the tangential locater has a vertical orienting pin which is adapted to abuttingly engage the base of the root.

13. The fixture of claim 12 wherein the vertical orienting pin is adapted to abuttingly engage the base of the root of the blade at the blade root center plane.

14. The fixture of claim 13 wherein the vertical orienting pin is adapted to abuttingly engage the base of the root of the blade at the stacking line of the blade.

15. The fixture of claim 5 wherein the tangential locater has a curved edge which adapts the locater to engage the wall bounding the groove of the root.

* * * * *